April 7, 1953     G. F. H. VON STROH ET AL     2,633,614

FLEXIBLE BELT CONNECTOR

Filed Jan. 15, 1951

INVENTOR
Gerald F. H. von Stroh and
Forbes R. Clarke, Jr.

BY Sidney U. Russell

ATTORNEY

Patented Apr. 7, 1953

2,633,614

UNITED STATES PATENT OFFICE 2,633,614

FLEXIBLE BELT CONNECTOR

Gerald F. H. von Stroh and Forbes R. Clarke, Jr., Huntington, W. Va., assignors to Bituminous Coal Research, Inc., Washington, D. C., a corporation of Delaware Application January 15, 1951, Serial No. 206,056

2 Claims. (Cl. 24—39)

This invention relates to a device adapted to interconnect the terminal ends of belting fabricated of various materials but particularly metallic belting, such as stainless steel belting, or belting of similar hard metals or metal alloys. More particularly the invention comprises a connector of spring-like qualities having an inherent elasticity which permits the connection to be easily made and facilitates the placing or removal of the belting upon the usual type of pulleys.

Heretofore great difficulty has been encountered in connecting belting made of the stated materials, such as stainless steel. Previous efforts at such connections have revolved about the use of welding, brazing, or riveting the ends of such belting. These methods by and large involve certain inherent disadvantages, since belts fastened together in this manner tend to part at or near the point of interconnection after a limited amount of use. Furthermore, it is difficult to position such a belt, so connected, upon the bearing surfaces normally used in conveyor systems or upon simple pulleys, the reason therefor being the inherent non-elasticity of such methods of connection. Most belts of the "endless" type necessarily must pass over a circular surface, such as a pulley, which causes considerable stresses and strains to be set up at the point of curvature in the material of which the belting is fabricated. If the belt be connected by such means as welding or riveting, the strains produced by passing the belt over a pulley of relatively small diameter are so great as to cause appreciable strain upon this manner of connection, ultimately causing fracturing or other complete deterioration of the same.

It will be appreciated that the most stress is applied to steel or other metallic belting at the sections immediately adjacent the point of interconnection. If the end be welded, the interconnection is one which is relatively inflexible, so that in passing over a curved surface, such as a pulley, the welded portion remains flat, the portions adjacent thereto of necessity being subjected to an angular bend of even greater extent than that of the curved surface of the pulley. By the use of our invention, such stresses at the points of interconnection are obviated.

Furthermore, metallic belting such as stainless steel belting is coming more into commercial use in conveying systems where the agitation, chattering or vibration of the belting must be reduced to a minimum for efficient performance. Interconnecting the ends of belting by rigid and non-elastic means, such as riveting or welding, will tend to increase rather than decrease any tendency of metallic belting to chatter or vibrate, not to mention the inherent propensity of such means to fracture and deteriorate after comparatively short usage.

Accordingly, it is a primary object of our invention to provide an interconnecting means for such metallic continuous belting that is of greater durability, which will reduce to a considerable extent the tendency to chatter in such mechanisms and which facilitates the positioning and removal of belting of this type from various kinds of conveying elements such as end pulleys over which belting of this type is driven.

A further object of our invention is the provision of a means as generally described in the foregoing that will simplify the manner of making the interconnection and reduce to a minimum the man hours which are normally spent in replacing ordinary types of connecting means.

Another object of the invention is to provide an interconnecting means for metallic or other belting which substantially reduces the stresses and strains placed upon the portions adjacent the interconnection when passing over a curved surface under tension, thereby eliminating the usual causes for deterioration of the belt and substantially increasing the useful commercial life thereof.

An additional object of the invention is to provide a connecting element which represents an extreme in simplicity and, therefore, may be produced for commercial usage at a minimum of cost.

It is apparent that other objects and advantages of our invention will be recognized from the following detailed description of a preferred embodiment thereof as illustrated in the accompanying drawings.

Referring more particularly to the drawings, a belt of the described type, that is, one made of stainless steel or other metallic material of considerable strength and hardness, is illustrated at 1. The belting is here shown as mounted for continuous rotation on two oppositely positioned pulleys 2 and 3. It will be understood that the belt is usually positioned in this manner in various types of mechanisms, it necessarily being placed under sufficient tension to assure its retention upon the pulleys.

Figure 2:
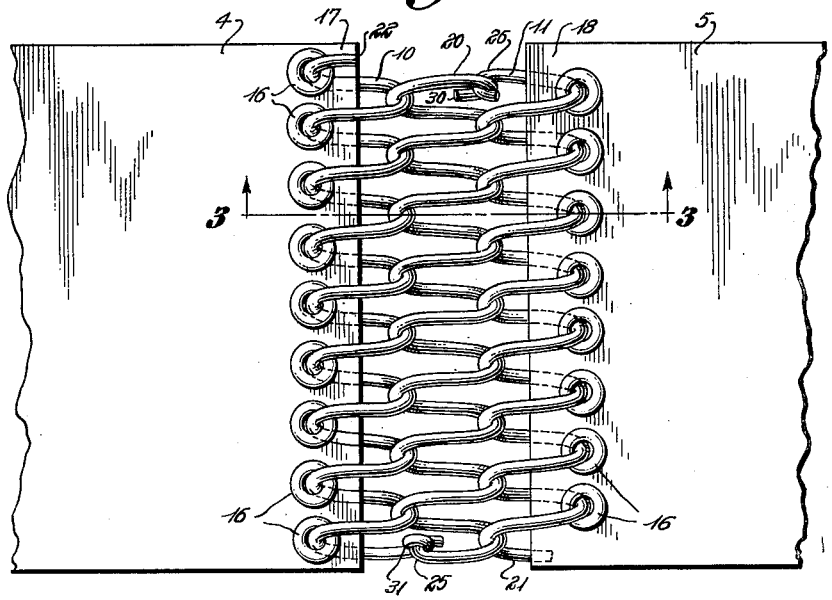
Figure 2 is a top plan view of the invention illustrated in Figure 1.

Each end of such a belt, here respectively designated generally at 4 and 5, is provided with a series of apertures 15 extending across the width of the belt and adjacent the ends thereof. Preferably these opposite apertures are staggered with respect to each other as indicated in Figure 2. This staggering of the same will facilitate intertwining or weaving of the helical convolution of the intermediate connecting member, which will hereinafter be referred to. To reduce wear upon the belt itself and also to prevent as much wear as possible occurring upon the connecting members themselves, each of these apertures is provided with a collar or grommet 16 firmly affixed to the belt in the manner indicated in Figure 3. Grommets 16 are preferably made of a soft metal, alloy or other composition, in contrast to the belt itself, and these will cushion the connecting elements and provide a bearing surface when tension is placed upon the belt.

Each series of apertures upon each of the ends 4 and 5 of the belt is fitted with a helical element made of spring steel or other material enabling it to retain its original shape but of substantial elastic and tensile properties as to permit considerable flexibility of the same when placed under stress. The cross-sectional shape of each of these spring elements 10 and 11 may be of a circular, oval, or other similar configuration. However, the spiral convolutions are preferably of sufficient circular configuration or sufficiently open to permit them to flatten upon the application of stress thereto without permanent deformation of the initial configuration. In other words, the shape of these convolutions are of such character as to inherently provide each of the elements 10 and 11 with considerable spring or elasticity.

A central helical spring member 20 is of the same type as those described, 10 and 11. The third member 20, however, is intertwined with each of the elements 10 and 11 simply by "threading" or rotating one end of element 20 through each of the convolutions of elements 10 and 11. The central member has, of course, those same characteristics of tensile strength and elasticity as described in reference to helical members 10 and 11. It is, of course, made of spring steel or other tempered metal which enables it to retain its initial shape and permits a reasonable amount of expansion of the same upon the application of a separating force or tension applied to either or both sides thereof.

Figure 1:
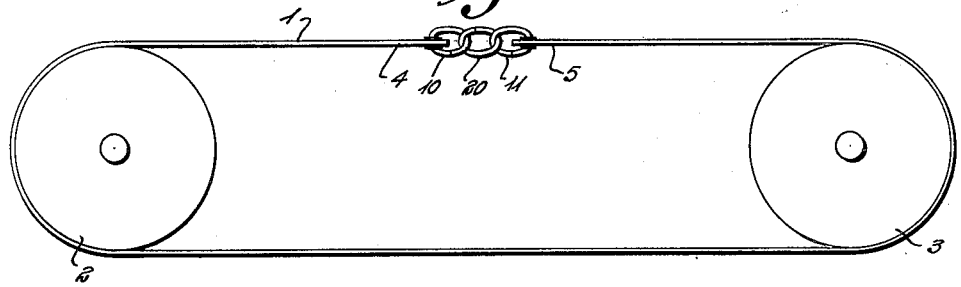
Figure 1 is a side elevation view of the invention as mounted for interconnection of the ends of a metallic belt.
Figure 3:
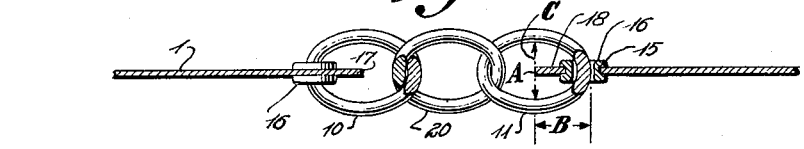
Figure 3 is a view taken on the line 3—3 of Figure 2.

Ordinarily when a belt is positioned in the manner illustrated in Figure 1, the tension upon the interconnecting or central spring member 20 is such that its tendency to become loosened from elements 10 and 11 is overcome. In other words, the central element will, upon the application of tension, become somewhat flattened with respect to its oval or circular configuration and will assume the shape as shown in Figures 1 and 3. The distortion of the circular or oval configuration of such spring members is similarly true of the side elements 10 and 11. That distortion, and the presence of considerable tension on the belt, will retain the connecting elements in place without substantial side or lateral movement thereof. Hence, ordinarily there need be no further retaining device designed to maintain the central spring element 20 in position, when the belt is connected in this manner and placed under longitudinal stress of a normal degree.

However, in cases where a belt of this type is used in mechanisms which produce an undue amount of chatter or vibration thereto, further securing means may be desirable. In such instances the respective ends of the central member 20 may be formed into hooked portions 25 and 30 as shown in Figure 2. These are designed to engage a complementary hooked portion 31 at one end of member 10 and another hooked portion 26 at the opposite end of member 11. Since these interconnecting hooked ends are not firmly affixed to one another, such method of retention of the three helical elements 10, 11 and 20 does not reduce or impair the inherent flexibility and resiliency of the same. It will be appreciated that the unconnected end portions 21 and 22 of the respective elements 10 and 11 may be similarly engaged by the formation of hooked portions upon these ends. However, in ordinary usage, this further expedient as a mode of retention will not be necessary. Such method of securing these respective ends assures retention of the several spring members in position despite the presence or absence of tension upon the belt. It will be understood, however, that this method of retention or one similar thereto is not necessary in ordinary usage of the connecting device, as when subject to tension in the manner described, the stress placed upon these several helical spring members being sufficient of itself to maintain them firmly in position.

The dismantling of the unit may be accomplished with extreme ease, since all that is required is the removal of tension upon the belt, and the reverse threading, in an opposite manner, of the several spring members.

With an interconnection of this type, not only is tension upon the belt properly maintained, but the connection itself is flexible, more so than other types of interconnection hereinbefore related, thus permitting the connection even under considerable tension to conform to the circumference of wheels or pulleys of very small diameters without serious impairment thereof. This inherent resiliency of the connecting device tends to diminish the natural vibration of belts made of metallic, as well as other, materials, and the simplicity of the unit renders installation and removal thereof an extremely easy operation.

By reference to Figure 3, it will be seen that the end portions 17 and 18 of the belt extend inwardly a considerable distance within each of the circular convolutions of members 10 and 11 to which the respective ends are attached in the manner described. As shown in this figure, the distance from the widest outside diameter of the links or spiral members 10 and 11, indicated at B, to the end A of the metallic belt approximately equals the internal diameter at the narrowest width of each convolution of members 10 and 11, or the diameter of such convolutions at the point C. This substantial extension of the end portions of the belt is adapted to further relieve stresses and strains set up in such portions when the connecting element and belt are passing over the curved surface such as a pulley. In addition, with the apertures 15 located at the substantial distance indicated from the ends of the belt, the tendency of the latter to tear or crack under tension is substantially obviated. We have also found that the spiral or helical elements 10 and 11, for optimum performance, should flatten during the application of tension to the belt at a lower rate than it takes to bend the metallic belt itself. This is accomplished by the use of helical spring elements of various sizes and strengths, dependent upon the amount of expected tension, size and gauge of belting and similar factors which will be appreciated by those skilled in the art.

Figure 4:
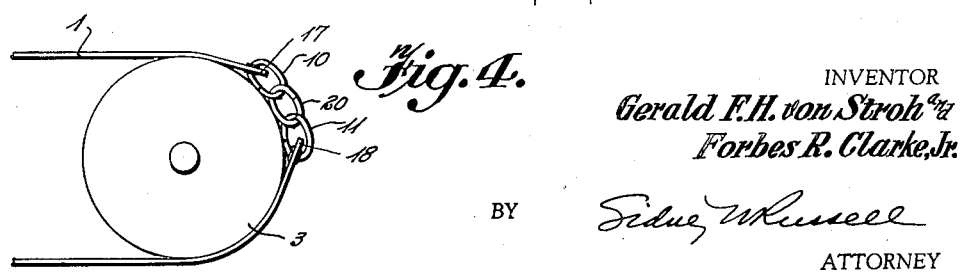
Figure 4 is a view similar to Figure 1, but showing the positioning of the interconnection when passing over a pulley under tension.

As will be seen by reference to Figure 4, as the interconnecting unit herein described passes over the curved surface of a pulley or wheel, these end portions of the belt 17 and 18 remain substantially straight. No tension in the way of an angular stress is placed upon such ends. The several elements 10, 11 and 20 conform to the curved surface but, at the same time, permit these end portions 17 and 18 to extend tangentially of the circumference of said surface. Thus, the device of our invention obviates the disadvantages of prior methods of interconnecting the ends of so called "endless" belts by removing the possibilities of imposing stresses and strains upon the belt itself at points adjacent the interconnection, such end portions not being subjected to any sharp or angular bend at the stated points of interconnection.

We have found that the necessary flexing of the interconnecting elements with the consequent relief from stresses and strains upon the end portions of the metallic belt can be completely accomplished only by the provision of a minimum of three elements such as those shown at 10, 11 and 20. Although more of such elements may be utilized, this is not necessary for ordinary purposes. However, the use of a lesser number, as, for example, only two interconnecting elements, would not provide the maximum flexibility and resiliency and would cause a consequently greater amount of strain to be placed upon the metallic belt adjacent the points of interconnection.

From the foregoing, it should be readily understood that the interconnecting unit of this invention solves in a simple and expedient manner the problem which has heretofore confronted the art and avoids the many recited disadvantages of various well known types of connecting media such as the use of rivets or welding, all of which involve means subject to excessive stresses and strains when in use, and therefore means which readily fracture or deteriorate after periods of relatively short usage.

What we claim is:

1. A belt connector for the two terminal ends of an imperforate metallic belt comprising at least three spring members, each of said members having spiral convolutions, said belt ends being provided with a series of apertures adjacent thereto, grommets of relatively soft metal in said apertures, one of said members being adapted to be engaged with one of said series of said grommets by threading therethrough, a second of said members adapted to engage the other of said series of said grommets by threading therethrough, the third of said members being engaged with the other two of said members by being interwoven therebetween and with the separate spirals of said other two of said members, said ends extending into the convolutions of said spring members a distance approximately equal to the internal diameter of the width thereof.

2. A belt connector for the two terminal ends of an imperforate metallic belt comprising at least three spring members, each of said members having spiral convolutions, said belt ends being provided with a series of apertures adjacent thereto, grommets of relatively soft metal in said apertures, one of said members being adapted to be engaged with one of said series of said grommets by threading therethrough, a second of said members adapted to engage the other of said series of said grommets by threading therethrough, the third of said members being engaged with the other two of said members by being interwoven therebetween and with the separate spirals of said other two of said members, said ends extending into the convolutions of said spring members a distance approximately equal to the internal diameter of the width thereof, each of said series of grommets being staggered with respect to the other of said series of said grommets.

GERALD F. H. von STROH.
FORBES R. CLARKE, Jr.

REFERENCES CITED

The following references are of record in the file of this patent:

UNITED STATES PATENTS

| Number | Name | Date |
|---|---|---|
| 372,427 | Norton | Nov. 1, 1887 |
| 1,828,304 | Woodman | Oct. 20, 1931 |